Sept. 11, 1928.
W. W. HAMILL
1,684,350
ROTARY TYPE FLOW METER
Filed Oct. 12, 1922
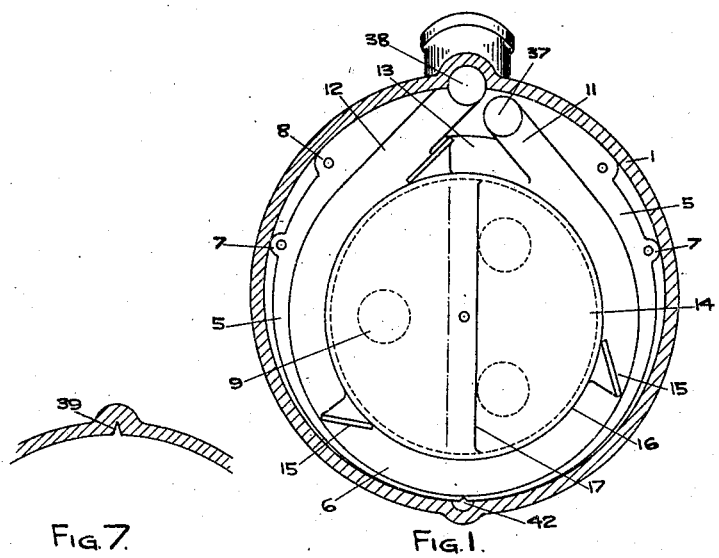
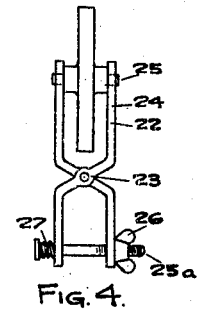
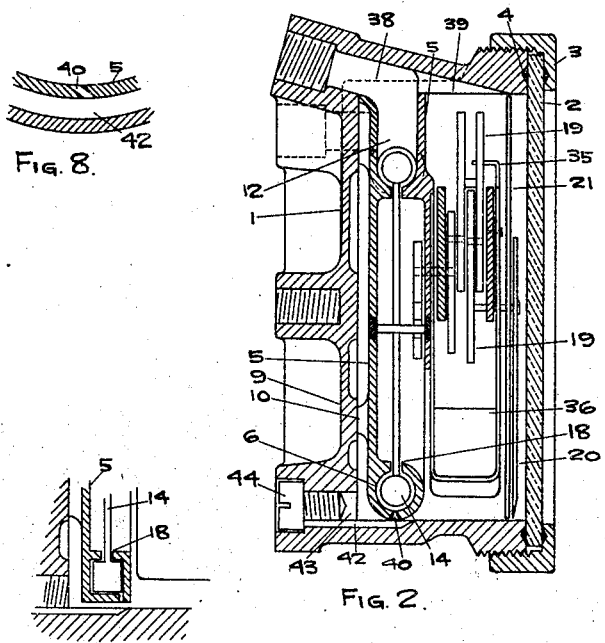
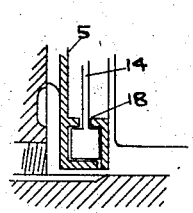
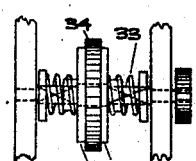
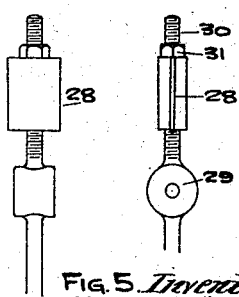
Fig. 5. Inventor
William W. Hamill
By James L. Norris
Attorney Patented Sept. 11, 1928.

1,684,350

UNITED STATES PATENT OFFICE.

WILLIAM WILSON HAMILL, OF BIRMINGHAM, ENGLAND.

ROTARY-TYPE FLOW METER.

Application filed October 12, 1922, Serial No. 594,204, and in Great Britain October 26, 1921.

This invention relates to devices for measuring and indicating fluids and consists of certain novel features described in the accompanying specification, illustrated in the attached drawings and more particularly pointed out in the appended claims.

Figure 1 is a sectional elevation of an instrument according to the present invention.

Figure 2 is a central sectional elevation at right angles to Figure 1.

Figure 3 is a fragmentary view of a modified shape of the channel forming part of Figure 2.

Figure 4 shows separately in elevation means for calibrating the instrument shown in Figures 1 and 2.

Figure 5 shows in elevation modified calibrating means.

Figure 6 is a view of one of the members of the gear train of the instrument shown in Figure 2 but fitted with a slipping clutch device.

Figure 7 is a fragmentary view of the upper part of the instrument shown in Figure 1, showing venting means.

Figure 8 is another fragmentary view showing a sump for deposit of foreign matter from the fluid.

In the drawings, the instrument comprises a main casing 1 with a glass or other transparent closure disc 2 retaining in fluid tight connection therewith by a screwed ring 3 and joint rings. Within the casing 1 is secured a rotor casing 5 divided in a plane at right angles to the axis and provided with an internal continuous channel 6 annular in contour and of constant cross sectional area, either circular, as shown in Figure 2, or square, as in Figure 3, or of any other suitable shape. Screws 7 secure together the halves of the rotor casing 5 and screws 8 hold it in position in the main casing 1, provision being made to prevent distortion by abutments 9, 10, on the main casing 1 and rotor casing 5 respectively. The fluid enters the channel 6 by way of a duct 11 and leaves through a duct 12, said ducts 11, 12, being arranged tangential to the channel 6 so that the fluid follows a natural stream line course with a low frictional loss of head. Said inlet duct 11 and outlet duct 12 are connected, respectively, to the inlet 37 and the outlet 38 of the casing 1 and are positioned in as close proximity to one another as convenient so that the segment of a circle through which the fluid is active approached in angular magnitude as near to 360° as the length of the idle or dead segment 13 will allow. Deviations from a true tangent incur a corresponding loss of head.

Pivotally and concentrically mounted in the rotor casing 5 is a rotor 14 having a plurality of vanes 15 mutually connected by a narrow flat annulus 16 and spokes 17 which pass through a gap 18 in the inner periphery of the channel 6, said gap being as small as convenient. A minimum of three vanes is preferable, but more may be used and the shape of the working ends of the vanes 15 on the rotor coincides with the tangential arrangement of the outlet port 12 to assist the centrifugal action and facilitate ingress and egress of the fluid. Gearing 19 of known type is used for communicating the movement of the rotor 14 to an indicating finger 20 which moves over a graduated dial 21 secured in the main casing 1 close to the glass cover 2. Said gearing and all the other moving parts are submerged in the fluid which passes through the instrument.

Slip between the active fluid and the rotor is minimized by making the clearance between the rotor and the channel as small as convenient manufacturing tolerances will allow, and by adapting the surface of the vanes to provide maximum opposition to the fluid and the surface of the channel to present minimum friction to the fluid. Such slip as takes place is provided for by gearing up the normal index reading and negating in an adjustable manner the effect of the gearing up. Adjusting means shown in Figure 4 consists of a brake of the caliber type with arms 22 pivoted at 23 to a stationary part of the casing, said arms being adapted to contract at one extremity 24 against the ends of the pivot 25 of one of the wheels in the train, through the agency of a bolt 25ᵃ nut 26 and spring 27 disposed at the opposite extremity of the said arms 22. Alternative regulable means comprise paddles 28 (Figure 5) attached to a rotating member 29 driven from or constituting one of the elements of the gear train. The effective area presented by the paddles 28 may be varied by changing their angular position on the rotating member to point in opposite directions relative to the direction of rotation. Each paddle 28 is mounted on a pivot 30 projecting radially from the hub of the rotating member 29 and is locked in adjusted position by a nut 31.

A friction device (Figure 6) may be used to allow slip to take place and damage to be avoided in case of locking of any of the moving parts, said device consisting of friction plate clutches 32 pressed by springs 33 against the faces of one of the gear train members 34.

To prevent normal operation in the case of liquids when the working fluid is removed, a sprag or detent 35 may be arranged as shown in Figure 2 to engage with one of the gear train members, said sprag or detent being automatically controlled by a float 36 which, for the sake of convenience, is not shown in the correct position but about 90° removed therefrom.

To drive off or purge the casing of air which would interfere with the correct working of the instrument, the inlet 37 is arranged below and preferably in close proximity to the outlet 38 and a small flow in the nature of a shunt or by pass is provided for, by arranging one or more vents, ports or holes 39 (Figures 2 and 7) at the highest points of the casing 1 and extending from the forward portion of the casing to the outlet 38 in which air or vapour can collect. The vent or vents 39 is or are of small sectional area, such as those made by a thin saw slot, so that they function as valves with the advantage that they require no attention. Calibration may be made by varying the area of the vent and thereby controlling the volume of the fluid which passes therethrough conveniently by an obturating screw.

At the bottom of the casing 1 means are provided for the deposit of foreign matter, such means being shown as consisting of a backwardly-directed orifice 40 (Figure 8) in the lower portion of the rotor casing 5 and communicating with the continuous channel 6 at such a position that the foreign matter which is held in suspension during the flow, gravitates, when the flow is interrupted into a sump 42 at the lower portion of the casing, and remains there until the sump can be cleaned out, through a port 43 closed by a screw 44.

Having described my invention, what I claim is:—

1. Apparatus of the character described, comprising a casing, a pair of separate, circular, channelled members, secured together in said casing with their channels in opposed relation and their inner perimeters spaced apart, and together forming a continuous curved fluid channel, said casing having an inlet and an outlet communicating with said channel, said outlet being above said inlet and connected to said channel at one side of the latter, a rotor extending into the space between the inner perimeters of said members and having vanes movable in said channel and closely fitting within the latter, and indicating means in said casing actuated by said rotor and located on the opposite side of said channel to the inlet of the latter.

2. Apparatus according to claim 1 having a passageway adjacent the outlet and extending from the indicator side of said channel to the outlet side of the latter.

3. An apparatus of the character described comprising a casing, means in said casing forming a continuous curved channel and having an inlet and an outlet, a rotor having elements adapted to revolve in said channel and adapted to be acted upon by the fluid passing through said channel throughout substantially the whole length of the latter, indicating means associated with said rotor, and float-controlled means operable when fluid is withdrawn from said casing to engage and lock one of the movable parts against action.

4. An apparatus of the character described, comprising a casing, a pair of complemental members secured together within said casing and forming a continuous circular channel with an annular slot in its inner perimeter, a rotor mounted to rotate in said casing with its periphery in said slot, vanes extending substantially tangentially to said rotor and rotatable in said channel and actuated by the flow of liquid through said chamber, one of said members having a fluid inlet and a fluid outlet so located with relation to one another and to said channel as to cause the liquid admitted at said inlet to traverse substantially the whole length of said channel, and indicating means associated with and actuated by said rotor.

5. An apparatus of the character described comprising a casing, means within said casing having a front face and a rear wall forming a continuous curved channel for the passage of fluid, said casing having at the upper portion of its rear wall a fluid inlet and a fluid outlet, said inlet and outlet communicating with the upper part of said channel with the outlet adjacent to and above the inlet, a rotor having vanes adapted to move in said channel and closely fitting within the latter, said casing having in the interior of its upper portion a groove extending rearwardly from a point adjacent its front face to said outlet for the escape of air, gas or vapor from the casing.

WILLIAM WILSON HAMILL.